S. W. YOUNG.

Wood-Screws.

No. 6,571. Reissued Aug. 3, 1875.

Witnesses:
Harry S. Miller.
Alonzo Hughes

Inventor:
Solomon W. Young,
by John J. Halstead.
Atty.

UNITED STATES PATENT OFFICE.

SOLOMON W. YOUNG, OF PROVIDENCE, RHODE ISLAND, ASSIGNOR, BY MESNE ASSIGNMENTS, TO JOHN W. HOARD AND LYMAN A. COOK, OF SAME PLACE.

IMPROVEMENT IN WOOD-SCREWS.

Specification forming part of Letters Patent No. 66,766, dated July 16, 1867; reissue No. 6,571, dated August 3, 1875; application filed December 11, 1874.

*To all whom it may concern:*

Be it known that I, SOLOMON W. YOUNG, of Providence, in the county of Providence and State of Rhode Island, have invented certain new and useful Improvements in Screws; and I do hereby declare the following to be a full, clear, and exact description of the same, reference being had to the accompanying drawings, in which—

Figure 1:
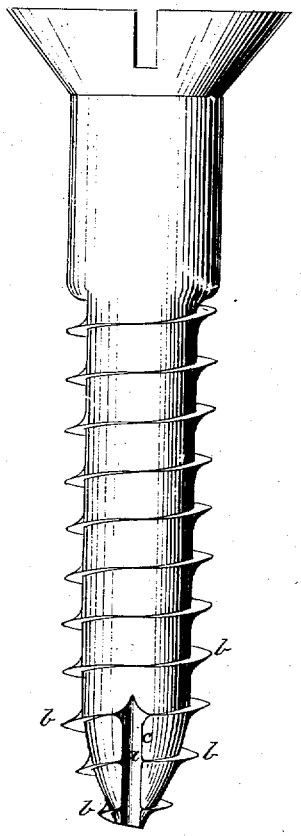
Figure 3:
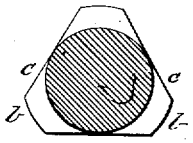
Figure 2:
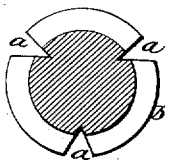

Figure 1 is an elevation, on an enlarged scale, of so much of a screw as is needed to illustrate the invention. Fig. 2 is a transverse section of the same on the line *x y*, Fig. 1; and Fig. 3 is a like section of a screw, in which is represented a modification of the invention.

The invention relates to that kind of screw known as wood-screws, and more particularly to that class in which the end of the screw tapers to a point. This latter screw is known as a gimlet-pointed screw, and the object to be attained by its particular construction is to facilitate the entrance of the screw into the wood, and to overcome the resistance offered by the latter when the hole into which the screw is inserted is too small, or of too contracted dimensions to admit it easily. The screw, however, only accomplishes these results to a certain extent, there being defects in its construction, and drawbacks to its use which this invention is intended to obviate. For instance, the screw, when being forced into place, will jam the wood away, the small end or point entering the wood first, being followed by the gradually-swelling shank, which jams or compresses the wood and forces it aside. This renders the operation of inserting the screw in hard or close-grained wood, especially where the hole formed for its reception is small, quite difficult and laborious, oftentimes causing the screw to be broken or otherwise injured, and particularly when the wood is thin, rendering it liable to be split or cracked by the screw.

To remedy these and other defects, which need not be here cited, the screw is constructed so that, instead of jamming the wood away, it shall cut its own thread as it gradually enters the wood. In the shank of the screw, (shown in Figs. 1 and 2,) and extending upward from the point, one or more longitudinal grooves or their equivalents are formed in the plane of, but obliquely to, the axis of the said shank. The effect of thus cutting away the surface of the screw is to form on each side of the groove or grooves a cutting-edge on both the screw-thread and the shank. When the screw thus constructed is put into the wood, and then turned so as to be forced down into place, these edges cut their way into the surrounding wood, enabling the operator to insert the screw to its full extent with ease, and as the edges do not jam or compress the wood, but cut it or force it away, there is not that danger of splitting the wood or damaging the screw which arises when the ordinary screw is used, especially when the wood is tough or close-grained.

To enable those skilled in the art to understand and use the invention, I will now proceed to describe the manner in which the same is or may be carried into effect, by reference to the accompanying drawings.

The screw shown in Fig. 1 in its general conformation resembles an ordinary wood-screw with a tapering point. Extending upward from the point are one or more longitudinal grooves, *a*, formed in the shank of the screw by suitable means, either by grinding, milling, or in any other convenient manner. The number of these grooves may vary, though it is found preferable to adopt the number (three) shown in the drawing. The grooves start from the point or lower extremity of the screw, and extend upward divergingly to points at or near which the shank ceases to taper and becomes cylindrical. At these points the grooves cease to be of any great use, as the part of the shank above the tapering portion follows in the thread or hole formed by the latter without expanding or enlarging it, or forcing away the wood in any degree. The course of the grooves *a*, as will be seen by reference to Fig. 1, is transverse to that of the screw-thread *b*, and consequently, at the points where the grooves intersect it, a cutting-edge, *c*, is formed, the projecting threads giving it a serrated formation, which materially aids the screw in its passage through the wood. For instance, suppose the screw in Fig. 1 to be inserted in a piece of wood, and turned so as to be forced into the same; the edges *c*, formed by the grooves, would cut their way, and the screw would gradually enter the wood, not by jamming and forcing the wood before or aside from it, but by cutting its path, thus displacing the wood with much greater ease than can be done with the old wood-screw, and avoiding, in great measure, all danger of splitting or cracking the material. It is very difficult, if not almost impossible, to force the ordinary gimlet-pointed screw into hard wood, unless the hole first formed for its reception is large, so as to nearly fit the same. But a screw constructed under this invention may be forced into a small hole in such wood without difficulty, and is thus not only better adapted for general use, but will hold more effectually and strongly than the screw of odinary manufacture.

In Fig. 3 is shown a modification of the invention, by which the same effect may be produced in a degree as is accomplished by the grooves. The surface of the screw, instead of being grooved, is ground or milled off, forming, as will readily be seen, a cutting-edge, *c*, as before.

Other equivalent means may also be employed instead of those already suggested, as it does not matter, so far as the principle of the invention is concerned, how the screw is cut away, so that the cutting-edge *c*, or its equivalent, is formed. It is found, however, that the groove will best effect the object in view, and it is preferable to use it in most instances. It will of course be understood that this invention is equally applicable to gimlets, augers, and other tools of a similar nature.

Having now described the invention, and the manner in which the same is or may be carried into effect, I would observe that I am aware that wood-screws have been heretofore made with a longitudinal cutting-edge formed both in the shank and in the thread, extending throughout their whole length. Such screws are not only of difficult construction, and consequently expensive, but have a cutting-edge which, beyond a certain point—*i. e.*, where the shank becomes cylindrical—is useless. I therefore do not claim, broadly, the forming upon a wood-screw of a cutting-edge transversely to the thread; but,

What I do claim, and desire to secure by Letters Patent, is—

As a new article of manufacture, a wood-screw whose gimlet or threaded point is grooved, milled off, or cut away upon its sides, in the plane of, but obliquely to, the line of its axis, substantially as and for the purpose described.

In testimony whereof I have signed my name to this specification before two subscribing witnesses.

SOLOMON W. YOUNG.

Witnesses:

JOHN C. PURKIS,
HENRY MARTIN.